(12) United States Patent
Bacallao

(10) Patent No.: US 10,591,954 B2
(45) Date of Patent: Mar. 17, 2020

(54) HOLDER FOR MULTIPLE MOBILE ELECTRONIC DEVICES

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 16/131,086

(22) Filed: Sep. 14, 2018

(65) Prior Publication Data

US 2019/0129469 A1 May 2, 2019

Related U.S. Application Data

(60) Provisional application No. 62/578,970, filed on Oct. 30, 2017.

(51) Int. Cl.
| | |
|---|---|
| *G06F 1/16* | (2006.01) |
| *H04M 1/06* | (2006.01) |
| *A45F 5/08* | (2006.01) |
| *H02J 7/00* | (2006.01) |

(Continued)

(52) U.S. Cl.
CPC .............. *G06F 1/1628* (2013.01); *A45F 5/00* (2013.01); *A45F 5/08* (2013.01); *H02J 7/0044* (2013.01); *H04M 1/04* (2013.01); *H04M 1/06* (2013.01); *A45F 2200/0516* (2013.01); *A45F 2200/0525* (2013.01)

(58) Field of Classification Search
CPC ........ G06F 1/1628; A45F 5/08; H02J 7/0044; H04M 1/04; H04M 1/06
See application file for complete search history.

(56) References Cited

U.S. PATENT DOCUMENTS

| | | | |
|---|---|---|---|
| 6,708,887 B1 * | 3/2004 | Garrett ................. | G06F 1/1626 235/462.45 |
| 7,480,138 B2 | 1/2009 | Kogan et al. | |
| 10,177,799 B2 * | 1/2019 | Brownlow ........... | H04B 1/3877 |

(Continued)

OTHER PUBLICATIONS

International Search Report & Written Opinion in PCT/US2018/050976 dated Nov. 8, 2018; 10 pages.

(Continued)

*Primary Examiner* — Hoa C Nguyen
*Assistant Examiner* — Keith DePew
(74) *Attorney, Agent, or Firm* — Schmeiser, Olsen & Watts LLP; Timothy P. Collins

(57) ABSTRACT

A mobile device cradle for interlacing two different mobile devices, comprising: a front surface; a first opening in the front surface for access to a display of the mobile devices; a second opening in the front surface for access to a keypad of the mobile devices; a third opening between the first and second openings in the front surface for access to a set of function keys of the mobile devices; a rear surface; a side surface extending between the front surface and the rear surface; an interior region formed between the front surface, the rear surface, and the side surface; a region of separation opposite the side surface for receiving one of the mobile devices into the interior region; and a coupling assembly at the rear region for coupling the cradle to the other of the mobile devices to an exterior of the rear region.

19 Claims, 8 Drawing Sheets

(51) Int. Cl.
*A45F 5/00* (2006.01)
*H04M 1/04* (2006.01)

(56) References Cited

U.S. PATENT DOCUMENTS

| | | | | |
|---|---|---|---|---|
| 2003/0222150 | A1* | 12/2003 | Sato | G06F 1/1626 235/472.02 |
| 2004/0198247 | A1* | 10/2004 | Jokinen | H04M 1/0283 455/90.1 |
| 2007/0223182 | A1* | 9/2007 | Swan | G06F 1/1632 361/730 |
| 2013/0102365 | A1* | 4/2013 | Oh | H04M 1/0241 455/566 |
| 2014/0289113 | A1* | 9/2014 | Decristoforo | G06Q 50/34 705/42 |
| 2016/0180129 | A1 | 6/2016 | Utykanski et al. | |
| 2017/0262910 | A1* | 9/2017 | Allen | G06Q 30/0601 |

OTHER PUBLICATIONS

"16*8.5*2cm Wallet Style Card Holder Magnetic Buckle Mirror PU Leather Universal Paste Type Case for Android and IOS Phone ( Samsung Huawei Xiaomi iPhone )—Navy Blue," Trait-tech.com, Aug. 22, 2017.
"Zebra MC40 Wearable OP Case with D-ring," UltimaCase.com, Aug. 22, 2017.
"OP Case for MC55 with Hand Strap," UltimaCase.com, Aug. 22, 2017.
"PIDION BIP 1500 Bluebird Case," MelgarCases.com, Aug. 22, 2017.
"Rubber Soft Handheld Radio Case Holster Protection," Amazon.com, Aug. 28, 2014.
"Carry Holder Case Holster," Pinterest.com, Aug. 22, 2017.
"Intermec CN3 Automatic Truck Mount," Case-Tech.com, Aug. 22, 2017.

* cited by examiner

HOLDER FOR MULTIPLE MOBILE ELECTRONIC DEVICES

CROSS REFERENCE TO RELATED APPLICATIONS

This application claims the priority and benefit of U.S. Application No. 62/578,970 entitled "Holder for Multiple Mobile Electronic Devices" filed Oct. 30, 2017, the contents of which are hereby incorporated by reference.

FIELD OF THE DISCLOSURE

The present disclosure relates generally to retail shopping technology, and more specifically to an apparatus for coupling multiple mobile devices together.

BACKGROUND

Retail establishments such as supermarkets, discount store retailers, convenience stores, and so on rely on some mobile electronic devices such as a Motorola® MC40 mobile computing device for a shopper to use to perform functions otherwise performed by a store associate, such as scanning universal product code (UPC) barcode labels, while relying on other devices such as an Ingenico® iSMP payment device to perform electronic payment functions such as processing credit card information.

SUMMARY

In one aspect, provided is a mobile device cradle for interlacing two different mobile devices, comprising a front surface; a first opening in the front surface for access to a display of the mobile devices; a second opening in the front surface for access to a keypad of the mobile devices; a third opening between the first and second openings in the front surface for access to a set of function keys of the mobile devices; a rear surface; a side surface extending between the front surface and the rear surface; an interior region formed between the front surface, the rear surface, and the side surface; a region of separation opposite the side surface for receiving one of the mobile devices into the interior region; and a coupling assembly at the rear region for coupling the cradle to the other of the mobile devices to an exterior of the rear region.

In some embodiments, the one of the mobile devices is a payment device that performs electronic payment functions and the other of the mobile devices is a scanning device.

In some embodiments, the scanning device is a Motorola® MC40 scanner, and the payment device is an Ingenico® iSMP payment device.

In some embodiments, the side surface includes a hole for receiving a protruding or connecting side surface component of the one of the mobile devices in the interior region so that the side surface component is accessible from the side surface of the mobile device cradle.

In some embodiments, the front, rear, and side surfaces include a common source of biodegradable and self-sterilizing polymer material, which includes elastic properties allowing the region of separation to be widened for inserting or removing the one of the mobile devices into an interior region, and returning to its original state after the insertion or removal of the one of the mobile devices.

In some embodiments, the rear surface includes a hole for securing the coupling assembly to the cradle.

In some embodiments, the mobile device cradle further comprises a connection element that is inserted through the hole in the rear surface for securing the coupling assembly to the cradle.

In some embodiments, the region of separation includes a first region that displays a card reader of the one of the mobile devices, and includes a second region having opening that is a greater width than the first region displaying an activation element of the of the one of the mobile devices.

In some embodiments, the coupling assembly comprises: a rear coupling base extending from the rear surface; a rear mount coupling between the other of the mobile devices and the rear coupling base; and a male coupling positioned in the rear coupling base for allowing the other of the mobile devices to swivel relative to the rear surface.

In another aspect, provided is a mobile device cradle for interlacing two different mobile devices, comprising: a unitary housing including: an interior region formed between a front surface, a rear surface, and a side surface of the housing; a plurality of openings for exposing a first mobile device positioned in the interior region; and a coupling assembly extending from the housing for coupling a second mobile device to the first mobile device in the interior region.

In some embodiments, the plurality of openings includes a first opening for access to a display of the first mobile device; a second opening for access to a keypad of the first mobile device; a third opening for access to a set of function keys of the first mobile device; and a region of separation for access to a card reader and scanning button of the first mobile device.

In some embodiments, the first mobile device is a payment device that performs electronic payment functions and the second mobile device is a scanning device.

In some embodiments, the mobile device cradle further comprises a fourth opening perpendicular to the first through third openings and opposite the region of separation for receiving a protruding or connecting side surface component of the first mobile device in the interior region so that the side surface component is accessible from the side surface of the mobile device cradle.

In some embodiments, the housing comprises a common source of biodegradable and self-sterilizing polymer material, which includes elastic properties allowing the region of separation to be widened for inserting or removing the first the mobile device into an interior region, and returning to its original state after the insertion or removal of the first mobile device.

In some embodiments, the coupling assembly extends from a region of the cradle opposite the first through third openings for coupling the second mobile device to the rear surface.

In some embodiments, the coupling assembly comprises: a rear coupling base extending from the rear surface; a rear mount coupling between the other of the mobile devices and the rear coupling base; and a male coupling positioned in the rear coupling base for allowing the second mobile device to swivel relative to the rear surface.

BRIEF DESCRIPTION OF THE DRAWINGS

Exemplary embodiments will now be described, by way of example only, with reference to the following drawings, in which.

DETAILED DESCRIPTION

Described are embodiments of a universal mobile device holder for coupling different mobile electronic devices together. Examples of a mobile electronic device may include but not be limited to a cellular telephone or smartphone, electronic tablet or notebook computing device, calculator, scanner, music, video, or multimedia device, or other device having a computer processor. In some embodiments, the holder may hold non-computing devices such as a notepad or voice recorder, or other item having dimensions configured for positioning in the holder. In some embodiments, the holder couples two different mobile electronic devices together, for example, a payment device that performs electronic payment functions and a scanning device that scans barcodes, QR codes, or the like, which communicate electronically with each other, referred to as electronic "pairing," for collectively perform a shopping-related operation, such as identifying an item of interest and electronically purchasing the item.

The mobile device holder is constructed and arranged for coupling two mobile electronic devices together, each having a different function but communicating with each other to collectively perform an operation during a shopper's movement in a store. For example, a Motorola® MC40 mobile computing device and Ingenico® iSMP payment device may each communicate with a store server, payment computer, or the like for performing barcode scanning and electronic payment functions, respectively. Here, the Ingenico® iSMP payment device is positioned in the interior region and held in place by a force provided by front and rear surfaces of the holder, while also attaching to a current MC40 back mount. In this example, the shopping user may perform such operations while also pushing a shopping cart. Although shopping carts are described, the mobile device holder may be constructed and arranged for removably coupling to a handle or rail of a shopping object or other fixed tubular or elongated element. The mobile device holder may be provided by the retail store to the customer, or alternatively, can be owned by the customer and brought into the store for use in the store by the customer.

Figure 1A:
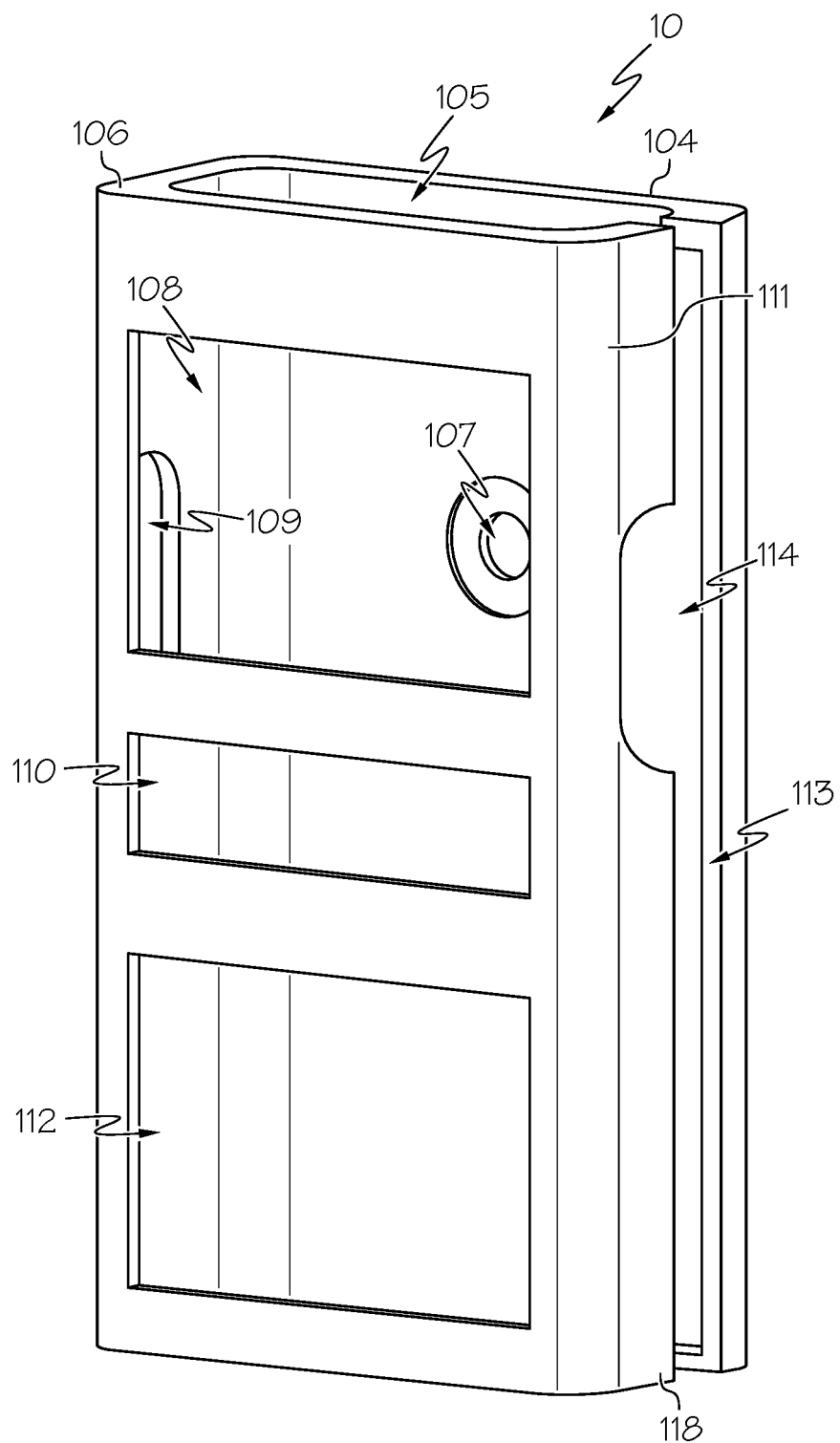
FIG. 1A is a front perspective view of a mobile device holder, in accordance with some embodiments.
Figure 1B:
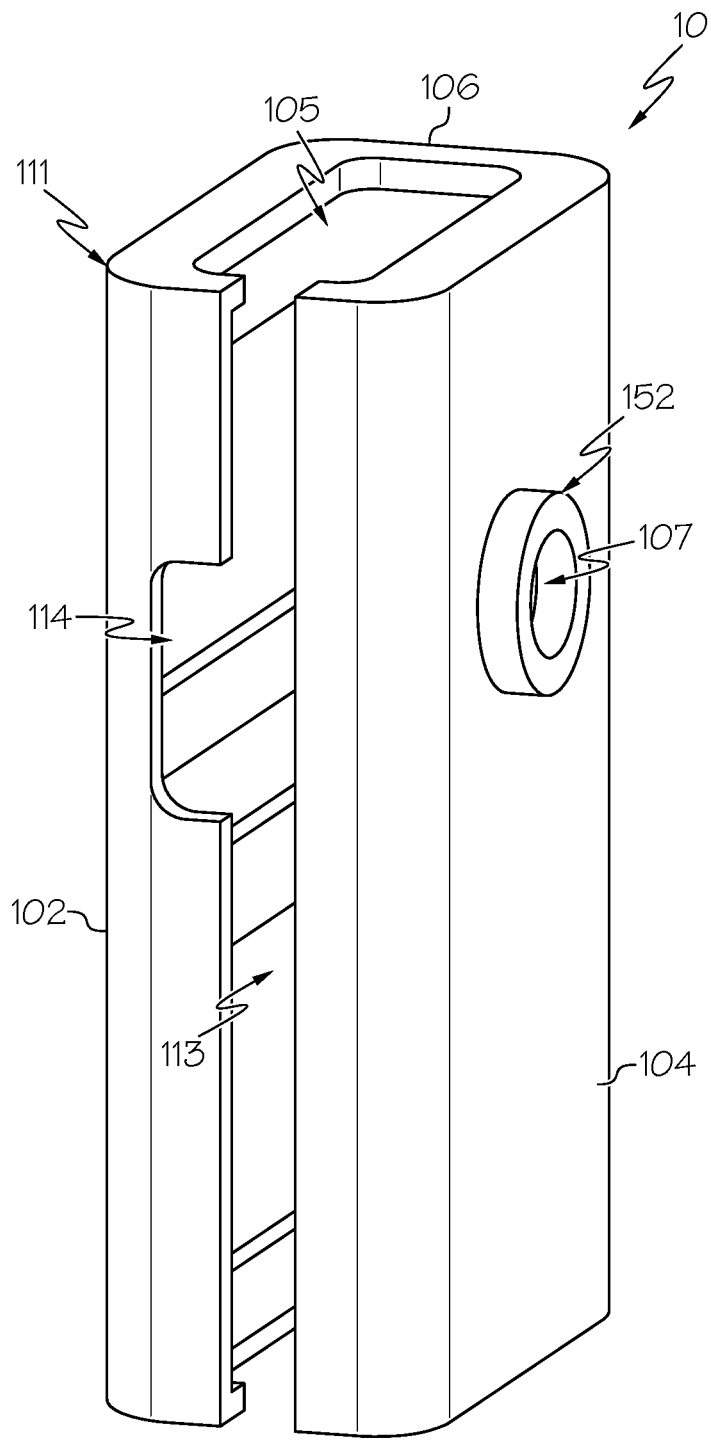
FIG. 1B is a rear perspective view of a mobile device holder, in accordance with some embodiments.

FIG. 1 is a perspective view of a mobile device holder 10, in accordance with some embodiments. The mobile device holder 10, also referred to as a cradle, includes a housing having a front surface 102, a rear surface 104, and a side surface 106 extending between the front 102 and rear 104 surfaces. The housing may be formed of a single material, such as a unitary molded plastic. In particular, a front surface 102, a rear surface 104, and a side surface 106 are unitary, or molded or machined of a common source of material, for example, a recyclable material such as nylon plastic, polylactide (PLA), or other biodegradable polymer material. In some embodiments, the housing is formed of a germ-free and/or self-sterilizing material. The material used to form the holder 10 preferably has elastic properties allowing the region of separation 113 to be widened for inserting a mobile electronic device into an interior region 105 formed by the front 102, rear 104, and side 106 surfaces, and returning to its original state and in doing so, may apply a force against the mobile electronic device therein.

The front 102, rear 104, and side 106 surfaces of the holder 10 collectively form a C-shape, U-shape, or the like, so that the region of separation 113 opposite the side surface 106 includes a gap, slit, or the like that separates the front surface 102 from the rear surface 104. The front 102 and rear 104 surfaces of the holder 10 may each include a lip 118 or curved corner that each curves toward the other to form the region of separation 113 between the front 102 and rear 104 surfaces. In some embodiments, there is no space or separation, but instead, the outermost edges of each surface 102, 104, or lip 118, directly abuts each other, for example, forming a seam or line of connection. Each curved corner 111 is provided to reduce the risk of abrasions or cuts to a user. The region of separation 113 extends along the length of the outermost curved corners of the front 102 and rear 104 surfaces of the holder 10. A portion of the region of separation 113 may include an opening 114, or tab or the like, that has a width or other dimension greater than the remaining portions of the region of separation 113, to allow a user to use a finger or object to widen the region of separation 113 in order to insert a mobile electronic device into the interior region 105 of the holder 10. Also, the region of separation 113 may display a card reader 29 or the like of the electronic payment device 14, and the opening 114 may include a window for displaying a scanning button 28 or other activation element, port, button, connector, or other protruding feature of the electronic payment device 14 for example, shown in FIG. 3.

The front surface 102 of the mobile device holder 10 may include a first opening 108 for access to a display 22 of a mobile device, a second opening 112 for access to a keypad 24 of the mobile device, and a third opening 110 between the first 108 and second 112 openings for access to a set of function keys 26 of the mobile device. In some embodiments, the mobile device is a smartphone or the like for positioning in the interior region 105. In other embodiments, the mobile device is a payment device that includes a credit card reader or the like for performing electronic payment functions, for example, an Ingenico® iSMP payment device. The mobile device may be inserted into the mobile device holder 10 via the top of the mobile device holder 10 and/or the region of separation 114 at the side of the mobile device holder 10. Alternatively, the mobile electronic device is inserted into the interior region 105 via an opening at one of the ends of the holder 10.

In some embodiments, the side surface 106 includes a hole or opening 109, which may be round, oval, elliptical, square, rectangular, or any other shape. An electronic payment device 14, for example, may include a power button (not shown), and/or USB cable port, and/or other buttons, switches, tabs, ports, and/or other well-known components of an electronic device on one side surface of the device 14 facing the side surface 106 of the holder 10 when inserted into the interior region 105. The side surface hole 109 permits protruding or connecting elements to be accessible through the holder 10. The other side surface having the region of separation 113, i.e., opposite side surface 106, may include a different button, port, or other protruding element such as a power button.

Figure 3:
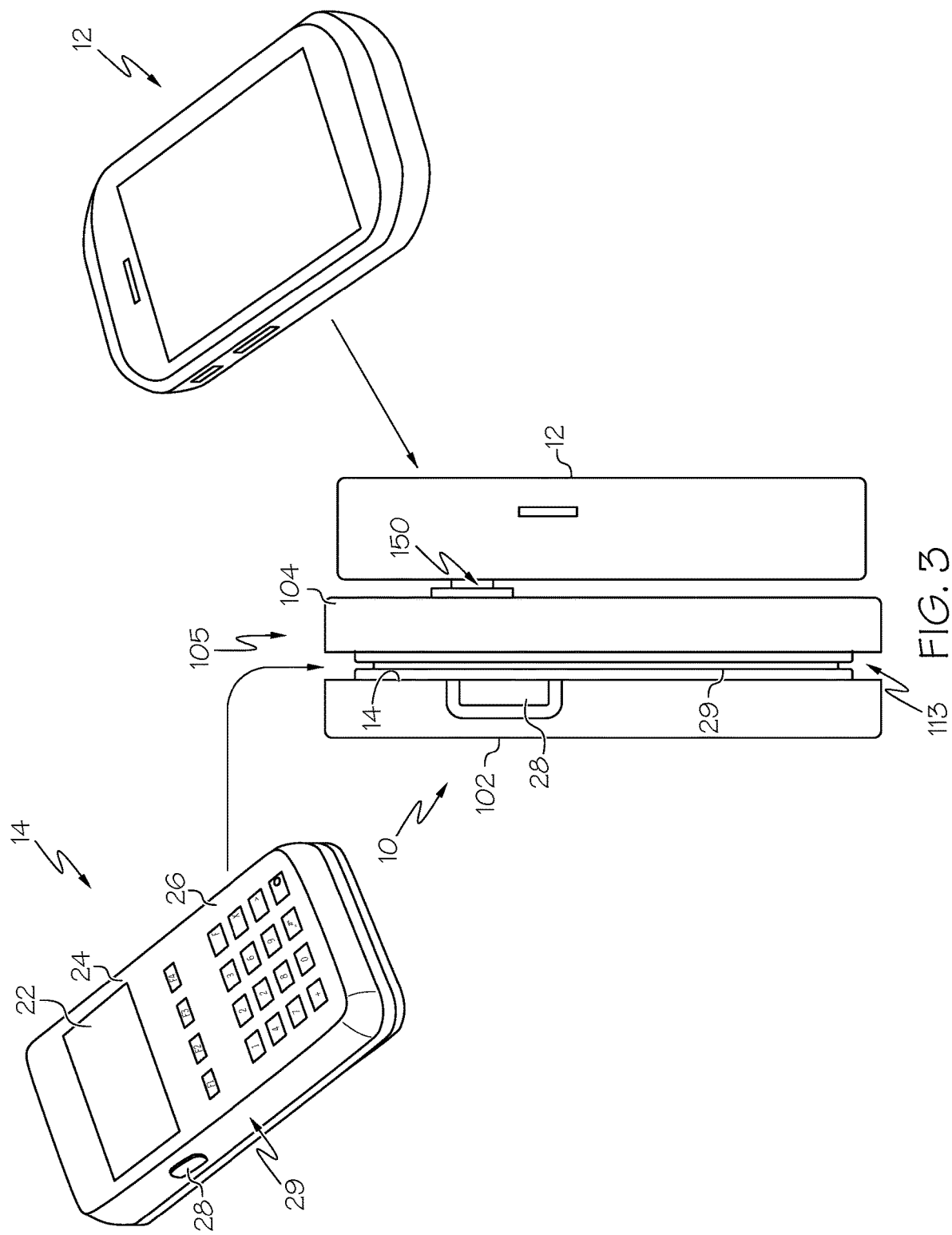
FIG. 3 is a side view of an electronic payment device inserted in a mobile device holder and coupled together with the handheld scanning device by the mobile device holder, in accordance with some embodiments.
Figure 4:
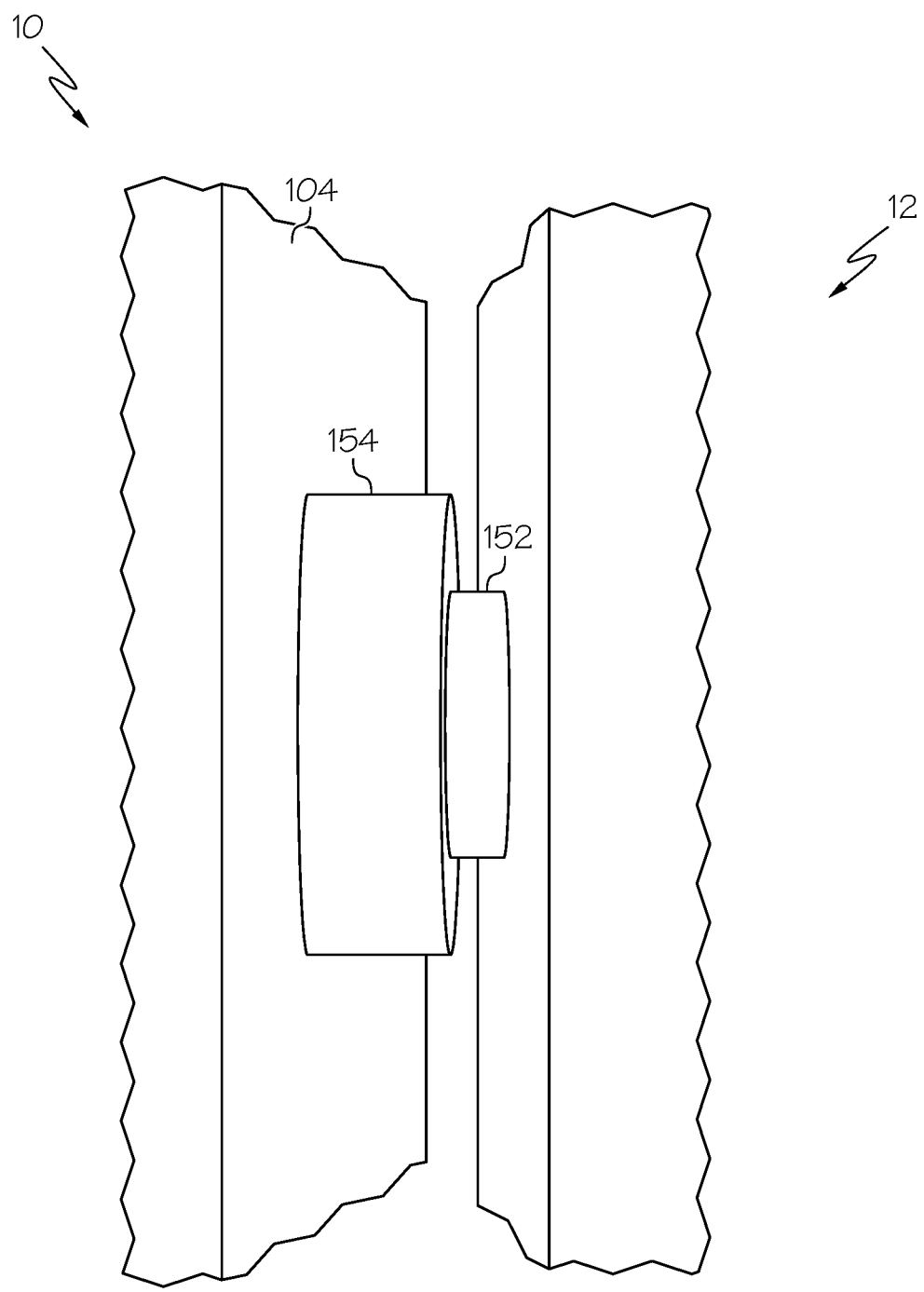
FIG. 4 is a closeup perspective view of the mobile device holder of FIG. 3.
Figure 5:
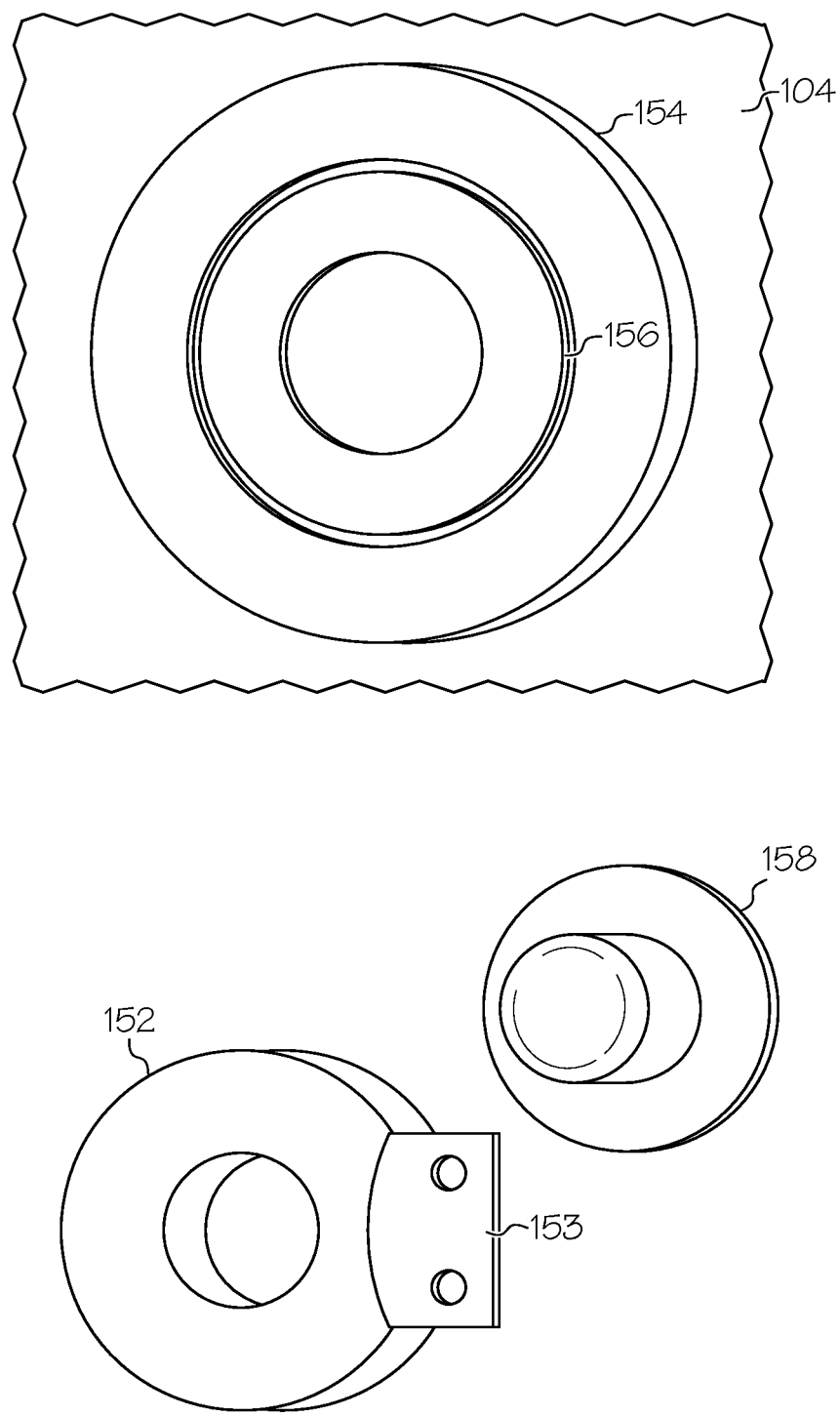
FIG. 5 is an exploded view of a coupling assembly for a mobile device holder, in accordance with some embodiments.

In some embodiments, the rear surface 104 includes a hole 107 for receiving a connection element 122, such as a screw of a coupling assembly 150 shown in FIGS. 3-5, in order to secure the holder 10 in place with a mobile computing device 12.

As described herein, the holder 10 is constructed and arranged to couple to two different mobile electronic devices, which may be paired with or otherwise communicate with each other with respect to shopping-related operations performed by a user of the mobile electronic devices. As also described herein, one of the mobile electronic devices is inserted into the holder 10, while the other mobile electronic device is coupled to an exterior surface, such as the rear surface 104 of the holder 10.

As shown in FIG. 5, the coupling assembly 150 includes a rear mount coupling 152, also referred to as a threaded cylindrical spacer, a rear coupling base 154, a washer 156, and a male coupling 158.

The rear coupling base 154 is constructed and arranged to extend from the rear surface 104 of the holder 10, and may be formed or molded of a common material so as to be unitary with the rear surface 104. The rear coupling base 154 is constructed and arranged receiving the connection element 122 extending through the rear surface 104 of the holder 10.

The rear mount coupling 152 includes an attachment plate 153 that couples directly to a surface of the mobile computing device 12. The rear mount coupling 152 may include an attachment plate 153 that extends from the rear mount coupling 152. The attachment plate 153 may be formed separately from and coupled to the spacer 152, for example, using an adhesive or coupling mechanism. Alternatively, the attachment plate 153 is formed of a same material as the spacer 152, such as molded plastic. Screws (not shown) extend through screw holes in the attachment plate 153 142 and 144 to screw the coupling apparatus 150 to a surface of the mobile computing device 12. In some embodiments, screws are replaced with a different form of fastener or coupler. Any type of fastener or coupler can be used to secure cylindrical spacer 152 to mobile computing device 12.

The male coupling 158 may be positioned through the washer 156, which in turn is positioned in a hole in the rear coupling base 154 for allowing the mobile electronic device 12 to swivel relative to the holder 10.

Figure 2A:
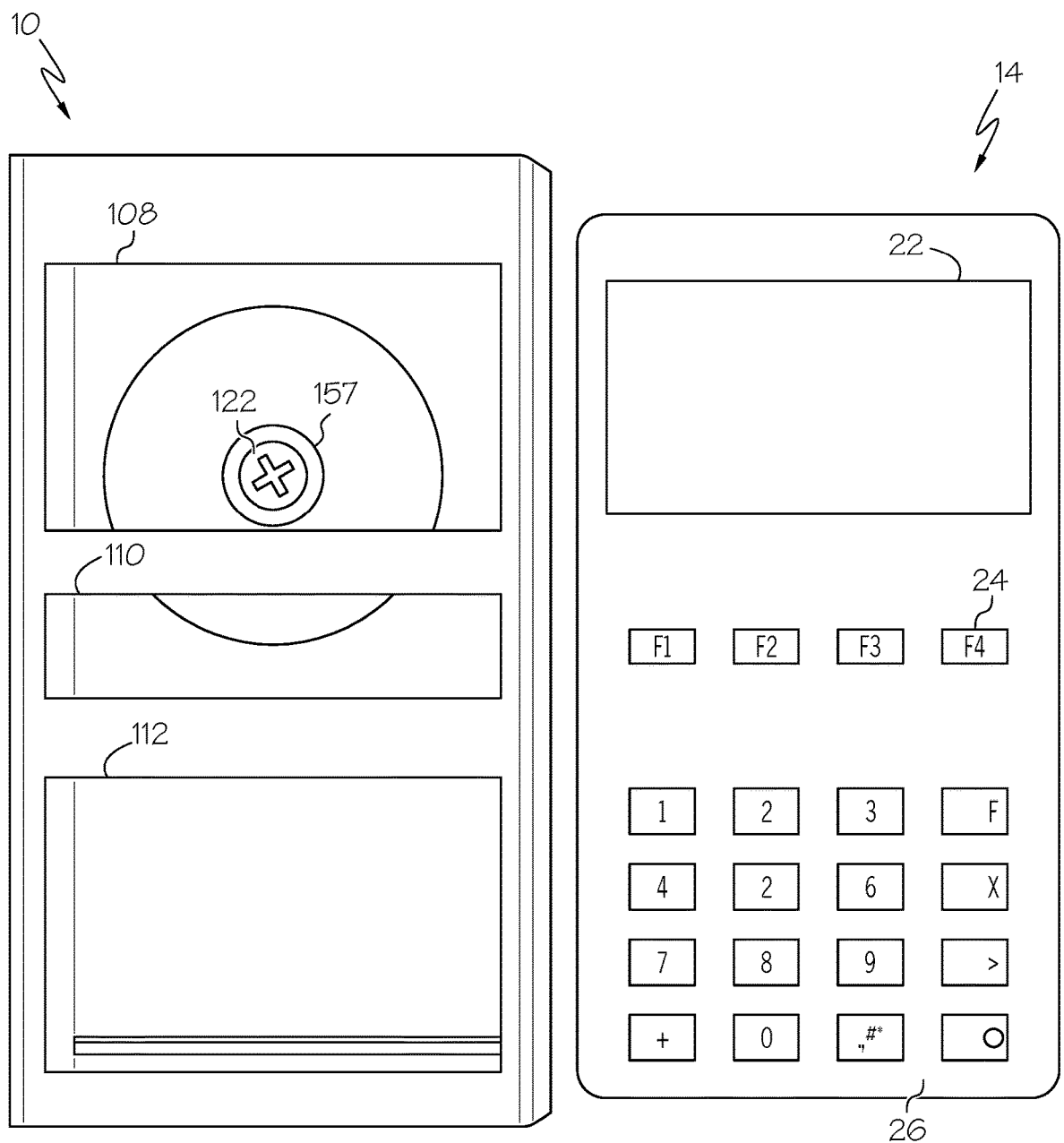
FIGS. 2A, 2B and 2C are perspective views of an electronic payment device inserted in the mobile device holder of FIG. 1.
Figure 2B:
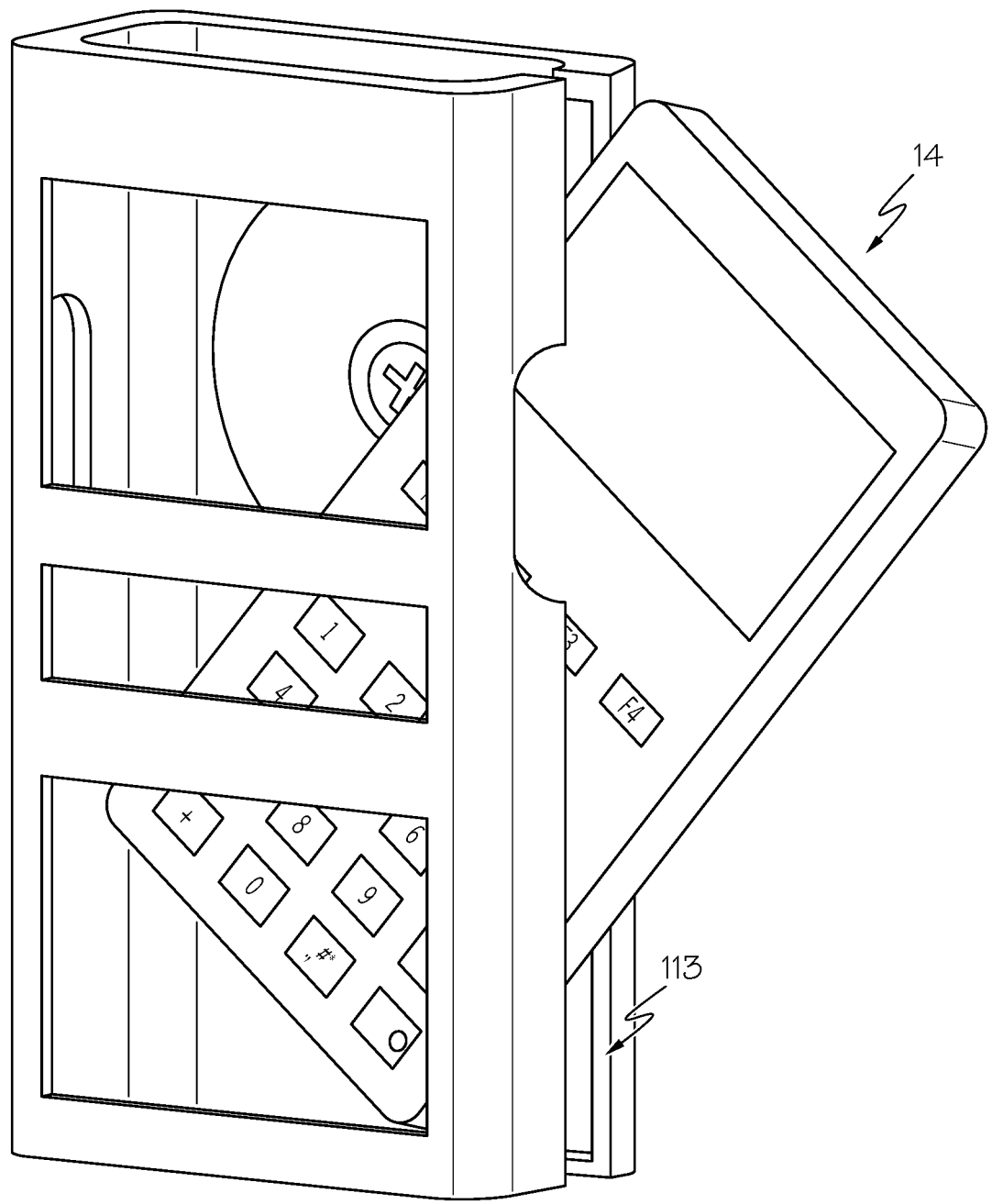
Figure 2C:
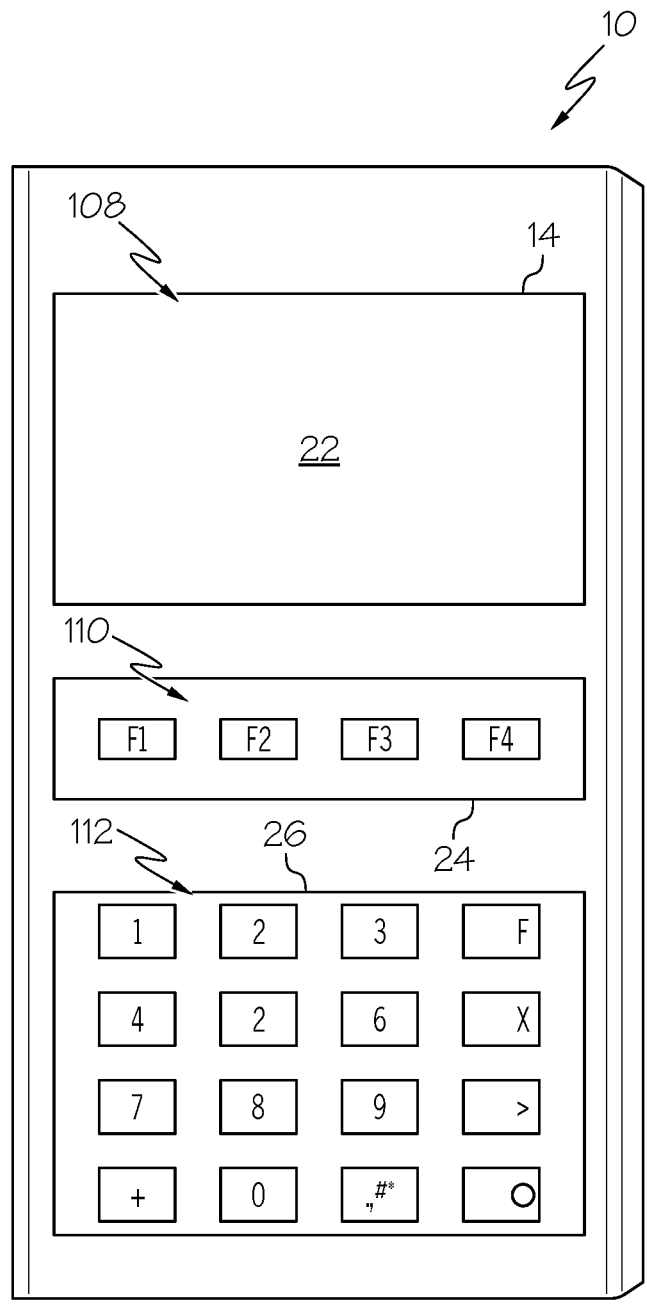

In some embodiments, referring again to FIG. 2B, two different mobile electronic devices 12, 14 are coupled to the holder 10 at the same time. For example, as shown in FIGS. 2A and 3, one of the mobile electronic devices 14 is an electronic payment device, which includes on its front surface a display screen 22, a set of function keys 24, and a set of character keys 26 or the like. The electronic payment device 14 may also include a scanning button 28 and credit card reader 29 or the like on its side surface. The holder 10 is constructed and arranged to display each of the display screen 22, function keys 24, and character keys 26, as well as the side scanning button 28 and card reader 29. In particular, the first opening 108 is constructed and arranged so that the display screen 22 is displayed for access by a user when inserted in the holder 10, the second opening 112 is constructed and arranged so that the keypad 46 is displayed for access by a user when inserted in the holder 10, the third opening 110 between the first 108 and second 112 openings is constructed and arranged so that the function keys 44 are displayed for access by a user when inserted in the holder 10, and the side surface hole 109 openings is constructed and arranged so that the power button, charging port, USB connector, and/or other interface-related connector or the like is displayed for access by a user when inserted in the holder 10. The other mobile electronic device 12 may be a scanning device. Here, the scanning device 12 may include a display screen, keyboard, and/or other components allowing the scanning device 12 to be operated.

After the two mobile electronic devices 12, 14 are co-located by each coupling to the holder 10, the two mobile electronic devices 12, 14 may be paired, or exchange data with each other via wireless communications, such as Bluetooth or the like. For example, the mobile electronic device 14 positioned in the interior region 105 of the holder 10 may function as a peripheral device to the mobile electronic device 12 external to the holder 10, or vice-versa. Alternatively, or in addition, each two mobile electronic devices 12, 14 may pair with a remote computing device such as a smartphone that communicates via a wireless technology. In some embodiments, the mobile device cradle 10 comprising a pass-through hole or the like that extends through its rear surface, for example, coexisting with or including cylindrical spacer 152, for providing a physical connection through a wire for connecting the two devices together.

The embodiments and examples set forth herein were presented in order to best explain the present invention and its practical application and to thereby enable those of ordinary skill in the art to make and use the invention. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

What is claimed is:

1. A mobile device cradle for interlacing two different mobile devices, comprising:
  a front surface having a length extending in a longitudinal direction of the mobile device cradle;
  a first opening in the front surface for access to a display of the mobile devices;
  a second opening in the front surface for access to a keypad of the mobile devices;
  a third opening between the first and second openings in the front surface for access to a set of function keys of the mobile devices;
  a rear surface having the length extending in the longitudinal direction of the mobile device cradle;
  a unitary single side surface having the length extending in the longitudinal direction between the front surface and the rear surface;
  an interior region between the front surface, the rear surface, and the side surface and having the same length as the front, rear, and side surfaces that extends from a top opening formed by the front, rear, and side surfaces to a bottom opening formed by the front, rear, and side surfaces;
a region of separation opposite the side surface and having the same length as the front, rear, and side surfaces and the interior region and having a width that is less than a width of the side surface; and
a coupling assembly at the rear surface for coupling the cradle to the other of the mobile devices to an exterior of the rear surface.

2. The mobile device cradle of claim 1, wherein the one of the mobile devices is a payment device that performs electronic payment functions and the other of the mobile devices is a scanning device.

3. The mobile device cradle of claim 2, wherein the scanning device is a Motorola® MC40 scanner, and the payment device is an Ingenico® iSMP payment device.

4. The mobile device cradle of claim 1, wherein the side surface includes a hole separated by the first through third openings by at least a portion of the side surface and having a width greater than the width of the region of separation and for receiving a protruding or connecting side surface component of the one of the mobile devices in the interior region so that the side surface component is accessible from the side surface of the mobile device cradle.

5. The mobile device cradle of claim 1, wherein the front, rear, and side surfaces include a common source of biodegradable and self-sterilizing polymer material, which includes elastic properties allowing the region of separation to be widened for inserting or removing the one of the mobile devices into an interior region, and returning to its original state after the insertion or removal of the one of the mobile devices.

6. The mobile device cradle of claim 1, the rear surface includes a hole for securing the coupling assembly to the cradle.

7. The mobile device cradle of claim 6, further comprising a connection element that is inserted through the hole in the rear surface for securing the coupling assembly to the cradle.

8. The mobile device cradle of claim 1, wherein the region of separation includes a first region that displays a card reader of the one of the mobile devices, and includes a second region having opening that is a greater width than the first region displaying an activation element of the of the one of the mobile devices.

9. The mobile device cradle of claim 1, wherein the coupling assembly comprises:
a rear coupling base extending from the rear surface;
a rear mount coupling between the other of the mobile devices and the rear coupling base; and
a male coupling positioned in the rear coupling base for allowing the other of the mobile devices to swivel relative to the rear surface.

10. A mobile device cradle for interlacing two different mobile devices, comprising:
a unitary housing including:
an interior region formed between a front surface, a rear surface, and a side surface of the housing; and
a plurality of openings for exposing a first mobile device positioned in the interior region, wherein the plurality of openings includes:
a first opening for access to a display of the first mobile device;
a second opening for access to a keypad of the first mobile device;
a third opening for access to a set of function keys of the first mobile device; and
a region of separation for access to a card reader and scanning button of the first mobile device; and
a coupling assembly extending from the housing for coupling a second mobile device to the first mobile device in the interior region.

11. The mobile device cradle of claim 10, wherein the first mobile device is a payment device that performs electronic payment functions and the second mobile device is a scanning device.

12. The mobile device cradle of claim 10, further comprising a fourth opening perpendicular to the first through third openings and opposite the region of separation for receiving a protruding or connecting side surface component of the first mobile device in the interior region so that the side surface component is accessible from the side surface of the mobile device cradle.

13. The mobile device cradle of claim 10, wherein housing comprises a common source of biodegradable and self-sterilizing polymer material, which includes elastic properties allowing the region of separation to be widened for inserting the first mobile device into or removing the first mobile device from the interior region, and returning to its original state after the insertion or removal of the first mobile device.

14. The mobile device cradle of claim 10, wherein the coupling assembly extends from a region of the cradle opposite the first through third openings for coupling the second mobile device to the rear surface.

15. The mobile device cradle of claim 14, wherein the coupling assembly comprises:
a rear coupling base extending from the rear surface;
a rear mount coupling between the other of the mobile devices and the rear coupling base; and
a male coupling positioned in the rear coupling base for allowing the second mobile device to swivel relative to the rear surface.

16. A mobile device cradle for interlacing two different mobile devices, comprising:
a front surface;
a first opening in the front surface for access to a display of the mobile devices;
a second opening in the front surface for access to a keypad of the mobile devices;
a third opening between the first and second openings in the front surface for access to a set of function keys of the mobile devices;
a rear surface;
a side surface extending between the front surface and the rear surface;
an interior region formed between the front surface, the rear surface, and the side surface;
a region of separation opposite the side surface for receiving one of the mobile devices into the interior region, wherein the region of separation includes a first region that displays a card reader of the one of the mobile devices, and includes a second region having opening that is a greater width than the first region displaying an activation element of the of the one of the mobile devices; and
a coupling assembly at the rear region for coupling the cradle to the other of the mobile devices to an exterior of the rear region.

17. The mobile device cradle of claim 16, wherein the one of the mobile devices is a payment device that performs electronic payment functions and the other of the mobile devices is a scanning device.

18. The mobile device cradle of claim 16, wherein the region of separation includes a first region that displays a card reader of the one of the mobile devices, and includes a second region having opening that is a greater width than the first region displaying an activation element of one of the mobile devices.

19. The mobile device cradle of claim 16, wherein the coupling assembly comprises:
- a rear coupling base extending from the rear surface;
- a rear mount coupling between the other of the mobile devices and the rear coupling base; and
- a male coupling positioned in the rear coupling base for allowing the second mobile device to swivel relative to the rear surface.

* * * * *